Dec. 26, 1961 A. J. FENTON 3,014,713
LOWERING DEVICE APPLICABLE TO AUTOMOBILE SPRINGS
Filed Feb. 2, 1959
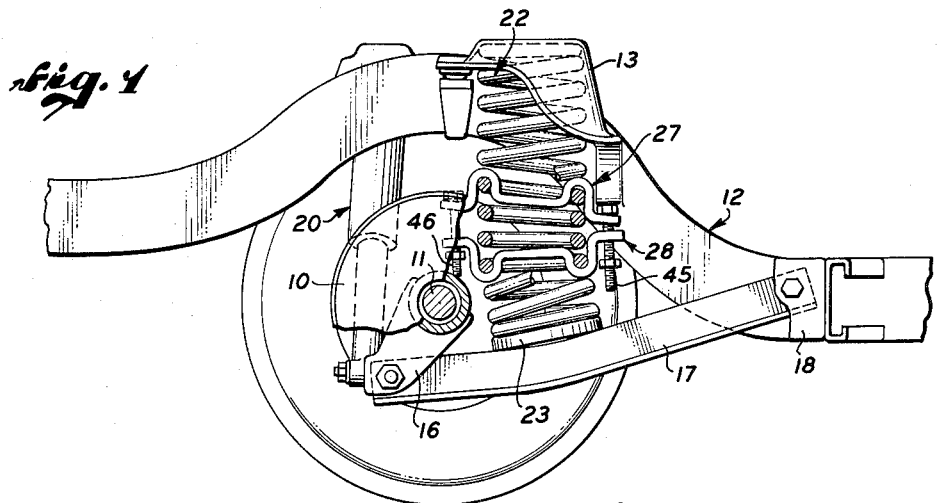
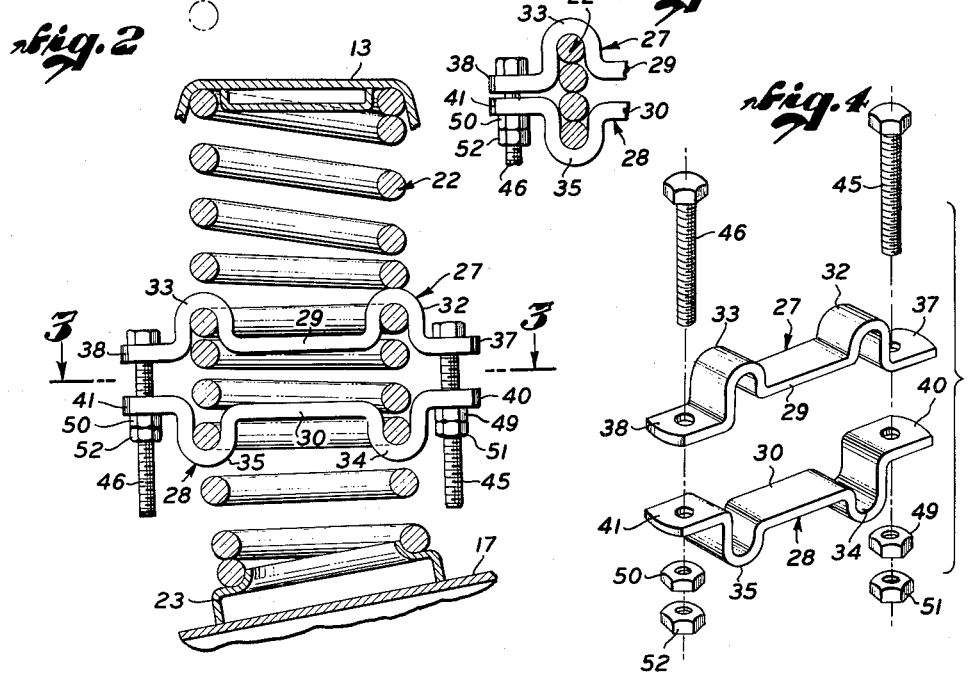
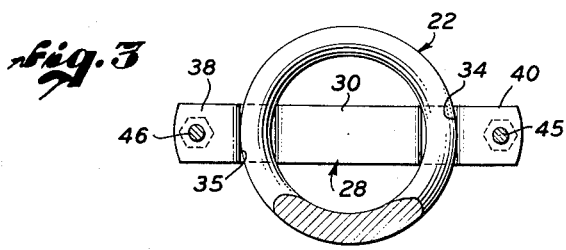
AARON J. FENTON,
INVENTOR.
HERZIG & JESSUP,
BY ATTORNEYS.

United States Patent Office 3,014,713
Patented Dec. 26, 1961

3,014,713
LOWERING DEVICE APPLICABLE TO
AUTOMOBILE SPRINGS
Aaron J. Fenton, 1218 S. Stearns Drive,
Los Angeles 35, Calif.
Filed Feb. 2, 1959, Ser. No. 790,538
9 Claims. (Cl. 267—60)

This invention relates to a method and means for lowering automobiles equipped with coil springs. The invention is particularly adapted, but not limited to the coil springs at the rear end of an automobile. As exemplified herein, the invention is disclosed as applied to the rear coil springs of an automobile as for example, a 1958 Chevrolet. Among other things, the use and application of the invention gives a desired sleek appearance to the automobile by lowering the rear end. The invention however has other objectives and advantages as will appear hereinafter.

In a preferred form of the invention, it comprises clamping means insertable between convolutions of a coil spring and adapted to clamp a group of adjacent convolutions together to inactivate that portion of the coil spring and to thereby lower the automobile by the amount of spacing between convolutions which is eliminated by clamping them together.

The primary object of the invention is accordingly to provide improved and simplified means for lowering automobiles having coil springs.

A further object of the invention is to provide improved means applicable to automobile coil springs for lowering the automobile for example, at the rear end, for lowering the center of gravity and to thereby decrease body rolling, to improve riding comfort and promote greater safety of operation.

Another object of the invention is to provide improved devices applicable to coil springs for lowering an automobile in the form of simplified clamp means which are very simple in construction yet very effective for their purpose but capable of being installed by automobile owners having limited or no mechanical skill and facilities in the way of tools and equipment.

Another object of the invention is to provide lowering means as in the foregoing in the form of simplified clamping devices especially suited and adapted to be marketed in the form of a kit with simplified instructions for installation by automobile owners and particularly adapted for marketing by dealers, garages, supply houses and service stations.

Another object of the invention is to provide improved and simplified means for lowering an automobile having coil springs in the form of a pair of clamping brackets shaped so as to be insertable between convolutions of a coil spring whereby a group of convolutions may be firmly clamped together by the bracket means so as to de-activate that portion of the coil spring and to lower the automobile by that amount.

Another object of the invention is to provide lowering means as in the foregoing objects wherein the clamping means are in the form of two bracket members each having a straight portion insertable between coil convolutions and each having a pair of loops or deformations engageable with a portion of a coil convolution and the brackets having extending lugs adapting the two brackets to be attached together by bolts whereby installation is extremely simple and easy but yet very effective for its purpose and very durable and long lasting.

Further objects and numerous additional advantages of the invention will become apparent from the following detailed description and annexed drawings wherein:

FIG. 1 is a partial view showing one wheel of an automobile having the invention applied thereto;

FIG. 2 is a detail view of the invention applied to convolutions of a coil spring;

FIG. 3 is a sectional view taken along the line 3—3 of FIG. 2;

FIG. 4 is a detail view of the clamping brackets of the lowering means of the invention; and FIG. 5 is a partial detail view showing the clamping means in fully clamped position.

Referring now more particularly to the drawings, in FIG. 1, numeral 10 designates a rear wheel brake drum of an automobile carried on a rear axle 11. Numeral 12 designates diagrammatically a portion of the automobile frame or chassis having an upper spring seat 13. The structure shown in the figure is a diagrammatical representation by way of example of the rear axle suspension in a 1958 Chevrolet automobile. Numeral 16 designates a bracket member which carries the rear axle, this member being pivotally attached to link or bar 17 which is pivoted to a bracket 18 on the chassis to provide for relative movement between members 12 and 16. Members 12 and 16 are connected by a shock absorber designated generally at 20.

The coil spring in FIG. 1 is indicated by numeral 22. It is seated between upper spring seat 13 and lower spring seat 23 which is on the upper side of link 17.

FIG. 2 shows the lowering means in position clamping four convolutions of the coil spring 22 together. FIG. 4 shows in detail a preferred form of the clamping means whereby a part of the coil spring is inactivated. The clamping means comprises a pair of similar brackets 27 and 28 each having a straight portion as shown at 29 and 30. Each of the brackets has a pair of oppositely extending loops, curved portions or deformations as shown at 32 and 33 for the bracket 27 and 34 and 35 for the bracket 28. These deformations have a configuration adapting them to fit snugly over portions of a convolution of the coil spring as may be seen in FIG. 2. Each of the brackets 27 and 28 has oppositely extending lugs as shown at 37 and 38 of the bracket 27 and 40 and 41 of the bracket 28. These lugs are disposed oppositely each other and a pair of through bolts or cap screws 45 and 46 are provided which extend through the lugs of the two brackets and are engaged by nuts as shown at 49 and 50 and lock nuts 51 and 52 for holding the brackets together.

The technique of installation of the lowering means by way of example is very simple and may be done by one having a minimum of mechanical skill and aptitude and with tools of the most simple type. In making the installation, the car is jacked up under the bumper and the wheels blocked. A bracket is inserted between convolutions preferably starting at the second coil from the bottom, the next four convolutions forming a group to be compressed, that is clamped together. The top or upper bracket is inserted between convolutions measuring four convolutions up from the one engaged by the lower bracket. Convolutions are counted, counting on the front face of the coil and also the rear face to make sure that four convolutions are engaged by both of the brackets so that the assembly appears as shown in FIG. 2. With the brackets or clamping devices in place, the car is let down from the jack and the cap screws or bolts 45 and 46 are then inserted from the top through the extending lugs of the brackets 27 and 28. The nuts are then applied and tightened up evenly, alternating between one cap screw and the other. To determine the exact amount of drop desired, a measurement is made from the bottom of the bumper to ground. After installing the lowering means on one side of the automobile, the procedure is repeated on the other side and the same measurement may be made again and then any minor adjustments may be made as necessary to insure that both sides are equal.

The lock nuts 51 and 52 may then be set up on each cap screw so that it will lock as a jamb nut insuring that the installation remains firmly, effectively and rigidly in place. When convolutions are fully clamped together they appear as in FIG. 5.

As may be seen, the installation of the lowering means clamps a group of adjacent convolutions of the coil spring together de-activating that part of the spring and eliminating or reducing the spacing between convolutions and lowering the automobile by that amount. As pointed out, preferably a group of four convolutions starting at the second convolution at the bottom is utilized. However, the invention may be applied using a different number of convolutions or de-activating different portions of the coil spring. The means for lowering are extremely simple but yet very effective for their purpose and, as can be observed by those skilled in the art, extremely easy of installation, enabling virtually any automobile owner to make the installation. The effect, as pointed out, is to lower the automobile; for example, only the rear end may be lowered to provide the desired sleek appearance. The installation lowers the center of gravity, improves the safety and handling characteristics and stability of the automobile.

The invention as exemplified in the foregoing may of course be applied to front end coil springs as well, and it may be applied in various types and makes of automobiles and automotive equipment.

The foregoing disclosure is representative of a preferred form of the invention and is to be interpreted in an illustrative rather than in a limiting sense. It is to be understood that various modifications and alternatives may occur to and be adopted by those skilled in the art without departing from the spirit and scope of the invention, the boundaries of which are to be in accordance with the scope of the claims appended hereto.

I claim:

1. In combination with an automobile having coil springs having end support means, means for lowering the normal height of the automobile by de-activating a predetermined number of convolutions of each of a plurality of said coil springs, said means comprising members engaging with convolutions of a coil spring and rigidly clamping a plurality of convolutions together to eliminate spacing between them and thereby reduce the extended length of the coil spring.

2. The combination of claim 1 wherein said means comprises two members engaging on opposite sides of a group of adjacent convolutions, said members being attached together.

3. The combination of claim 1 including bolt means engaging with said members to reduce the spacing between convolutions upon tightening of the bolt means.

4. In combination with an automobile having coil springs, means for lowering the normal height of the automobile comprising means for clamping together a group of adjacent convolutions of a coil spring, said means comprising at least one member inserted between convolutions and having a shape to interfittingly engage a convolution and means engaged with said member outside said spring to draw adjacent convolution portions toward each other.

5. The combination of claim 4 comprising two similar spaced members in opposed positions on opposite sides of a group of convolutions, the said members being drawn together by the bolt means for clamping the group of convolutions.

6. In combination with an automobile having coil springs, means for lowering the normal height of the automobile comprising means for rigidly clamping together a group of adjacent convolutions of a plurality of the springs, said means including a first bracket member between adjacent convolutions, said bracket member having a straight intermediate portion, a U-shaped formation adjacent each end engaged with portions of a coil convolution, said U-shaped portions having extended outer legs carrying lugs extending parallel to said straight intermediate portion, a second similar bracket oppositely positioned to said first bracket with a group of convolutions engaged between said brackets, and bolts engaging adjacent lugs of the two brackets for drawing them together to clamp the engaged convolutions.

7. In combination with an automobile having coil springs, means for lowering the normal height of the automobile by de-activating a predetermined number of convolutions of each of a plurality of said coil springs, said means comprising members engaging with convolutions of a coil spring and rigidly clamping a plurality of convolutions together to eliminate spacing between them and thereby reduce the extended length of the coil spring, said means comprising two members engaging on opposite sides of a group of adjacent convolutions, said members having portions between adjacent convolutions and deformed portions shaped to have a portion of a convolution fit thereinto and lugs at the ends of the said members securing adjacent ends of said members together.

8. In combination with an automobile having coil springs which are supported at their ends, means for lowering the normal height of the automobile by de-activating at least one convolution of each of a plurality of individual coil springs, said means comprising members having a portion having a configuration in holding engagement with at least a part of a convolution of a coil spring and rigidly clamping a part of the coil spring on the outside thereof to de-activate that part of the spring by eliminating the resiliency thereof.

9. In combination with an automobile having coil springs which are supported at their ends, means for lowering the normal height of the automobile by de-activating at least one convolution of a plurality of individual coil springs, said means having portions configurated to engage in holding relationship with at least a part of a convolution of a coil spring and having means outside of the spring for clamping a part of the spring to de-activate that part by eliminating the resiliency thereof.

References Cited in the file of this patent

UNITED STATES PATENTS

| | | |
|---|---|---|
| 2,135,820 | Kuchar | Nov. 8, 1938 |
| 2,661,206 | Gregoire | Dec. 1, 1953 |
| 2,896,940 | Lightbourn | July 28, 1959 |

FOREIGN PATENTS

| | | |
|---|---|---|
| 405,216 | Germany | Oct. 31, 1924 |